US008881573B2

(12) United States Patent
Paturle et al.

(10) Patent No.: US 8,881,573 B2
(45) Date of Patent: Nov. 11, 2014

(54) METHOD FOR DETECTING WEAR OF A TYRE CONTAINING A SONIC WEAR GAUGE

(75) Inventors: Antoine Paturle, Pont du Château (FR); David Mosnier, Clermont-Ferrand (FR)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 215 days.

(21) Appl. No.: 13/513,005

(22) PCT Filed: Dec. 1, 2010

(86) PCT No.: PCT/FR2010/052584
§ 371 (c)(1),
(2), (4) Date: Jul. 2, 2012

(87) PCT Pub. No.: WO2011/067535
PCT Pub. Date: Jun. 9, 2011

(65) Prior Publication Data
US 2012/0266649 A1    Oct. 25, 2012

(30) Foreign Application Priority Data
Dec. 2, 2009   (FR) ..................... 09 58586

(51) Int. Cl.
*G01N 19/02*   (2006.01)
*B60C 11/24*   (2006.01)

(52) U.S. Cl.
CPC ............. *B60C 11/24* (2013.01); *B60C 11/246* (2013.04)
USPC ............. 73/8; 152/154.2; 701/29.1; 701/31.7

(58) Field of Classification Search
CPC .................................................. B60C 11/246
USPC ....... 73/8; 152/154.2; 701/31.5, 31.7; 702/34
See application file for complete search history.

(56) References Cited

U.S. PATENT DOCUMENTS 6,278,361 B1    8/2001   Magiawala et al. ........... 340/438
6,668,220 B2 *  12/2003  Remboski et al. ........... 701/33.9
(Continued)

FOREIGN PATENT DOCUMENTS

DE   10 2004 036 811 A1   7/2005
DE   10 2004 016 488 A1   10/2005
(Continued)

OTHER PUBLICATIONS

Author: Machine translation of JP08-207515 A, Date of Patent Publication: Aug. 13, 1996, Publisher of translation: Japanese Patent Office and INPIT, pp. 1-7.*

(Continued)

*Primary Examiner* — Lisa Caputo
*Assistant Examiner* — Roger Hernandez-Prewit
(74) *Attorney, Agent, or Firm* — Fitzpatrick, Cella, Harper & Scinto

(57) ABSTRACT

A method for detecting wear of a tire involves at least one sonic wear gauge emitting an acoustic footprint noise that includes several acoustic footprint elementary frequency components. An acoustic signal that includes the acoustic footprint noise is acquired, with the acoustic signal including several elementary frequency components acquired in the frequency domain. Several series of elementary frequency components are enumerated, with each enumerated series forming some part of the acoustic footprint elementary frequency components. An acoustic footprint series is determined and, if a confidence index determined based on a local confidence index is greater or less than a predetermined threshold, an alert regarding the wear of the tire is emitted.

26 Claims, 7 Drawing Sheets

(56) References Cited

U.S. PATENT DOCUMENTS

| | | | |
|---|---|---|---|
| 7,204,135 B2 | 4/2007 | Robert | 73/146 |
| 7,391,306 B2 | 6/2008 | Dufournier | 340/442 |
| 8,061,191 B2 | 11/2011 | Hanatsuka | 73/146 |
| 8,121,818 B2 * | 2/2012 | Gorinevsky | 702/183 |
| 2004/0154715 A1 | 8/2004 | Dufournier | 152/154.2 |
| 2011/0252862 A1 | 10/2011 | Paturle | 73/8 |
| 2011/0259490 A1 | 10/2011 | Paturle | 152/154.2 |
| 2012/0010776 A1 | 1/2012 | Paturle | 701/31.5 |
| 2012/0266650 A1 | 10/2012 | Paturle | 73/8 |
| 2012/0273102 A1 | 11/2012 | Paturle | 152/154.2 |

FOREIGN PATENT DOCUMENTS

| | | |
|---|---|---|
| FR | 2 816 887 A1 | 5/2002 |
| JP | 1-282006 A | 11/1989 |
| JP | 8-207515 A | 8/1996 |
| JP | 10-307981 A | 11/1998 |
| JP | 2001-215175 A | 8/2001 |
| JP | 2003-526560 A | 9/2003 |
| JP | 2005-067407 A | 3/2005 |
| JP | 2005-186702 A | 7/2005 |
| JP | 2005-532205 A1 | 10/2005 |
| JP | 2009-018667 A | 1/2009 |
| JP | 2012-520793 A | 9/2012 |
| WO | WO 01/68388 A1 | 9/2001 |
| WO | WO 03/064188 A1 | 8/2003 |
| WO | WO 2005/003698 A1 | 1/2005 |
| WO | WO 2009/095288 A1 | 8/2009 |
| WO | WO 2010/052409 A1 | 5/2010 |

OTHER PUBLICATIONS

Japanese Patent Office Search Report for Patent Application 2012-541563, mailed: Apr. 14, 2014, Author: Yasufumi Nakagawa, pp. 1-6.*

English language translation of Japanese Patent Office Search Report for Patent Application 2012-541563, mailed: Apr. 14, 2014, pp. 1-5.*

* cited by examiner

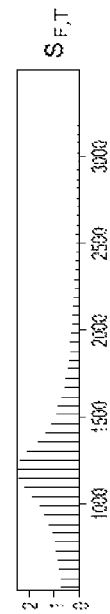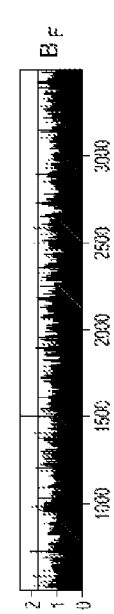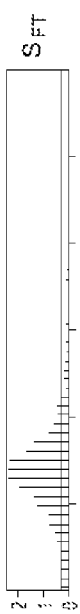
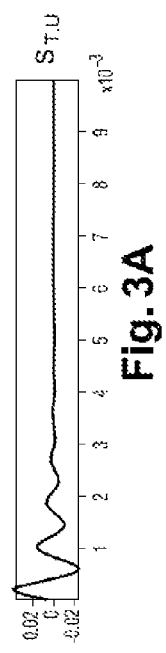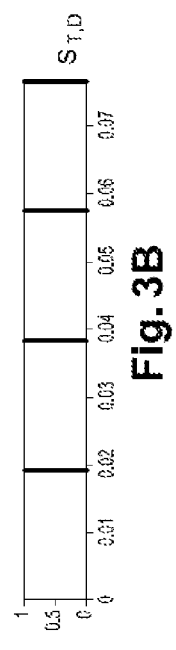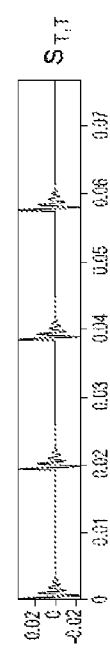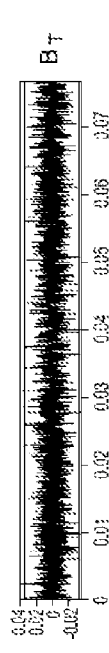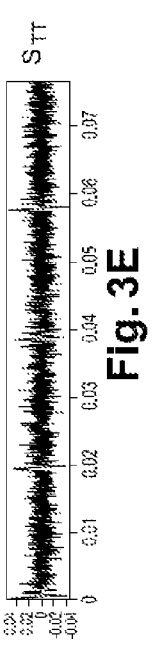
Fig. 3A  Fig. 3B  Fig. 3C  Fig. 3D  Fig. 3E
Fig. 4A  Fig. 4B  Fig. 4C  Fig. 4D  Fig. 4E

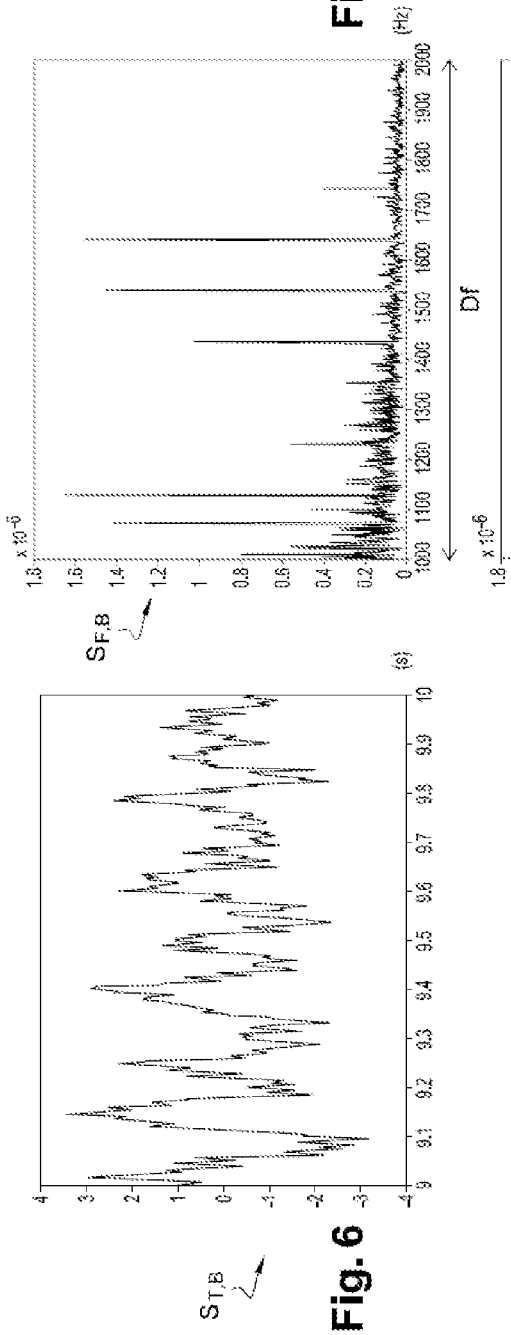
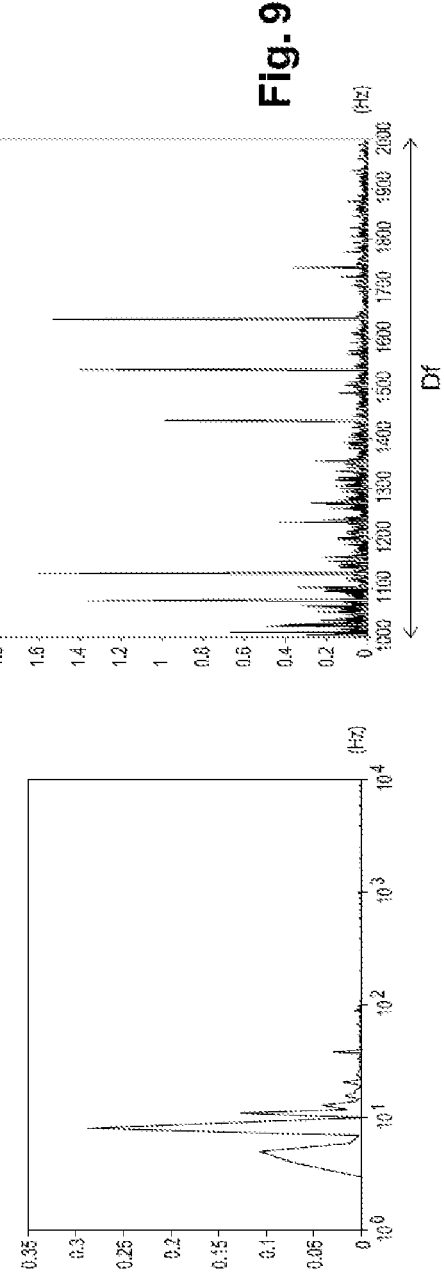
Fig. 6
Fig. 7
Fig. 8
Fig. 9

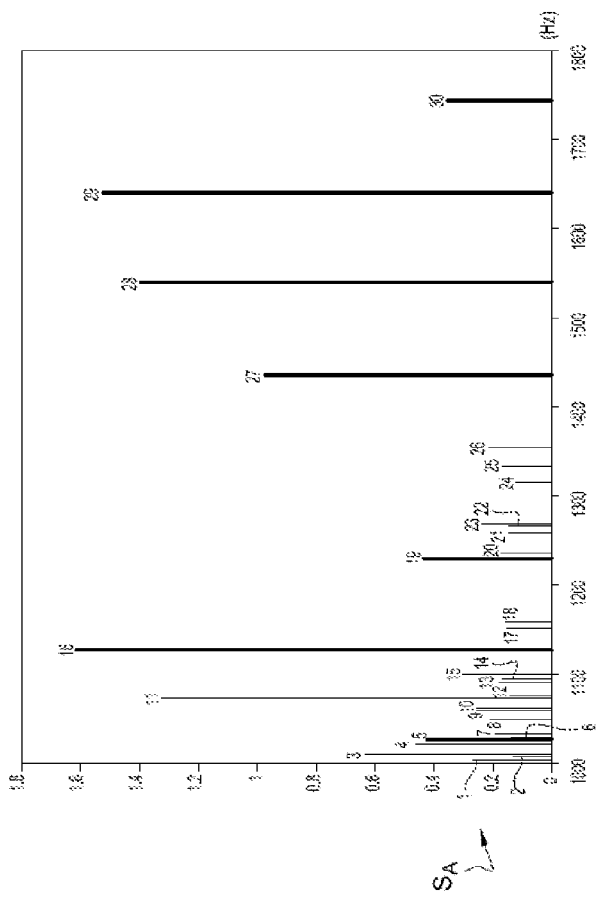
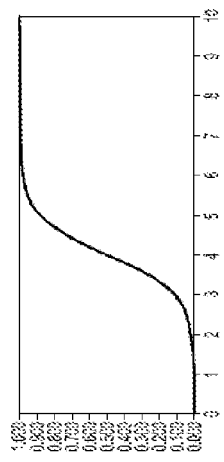
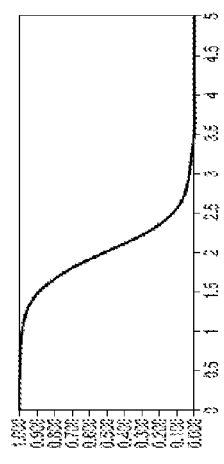

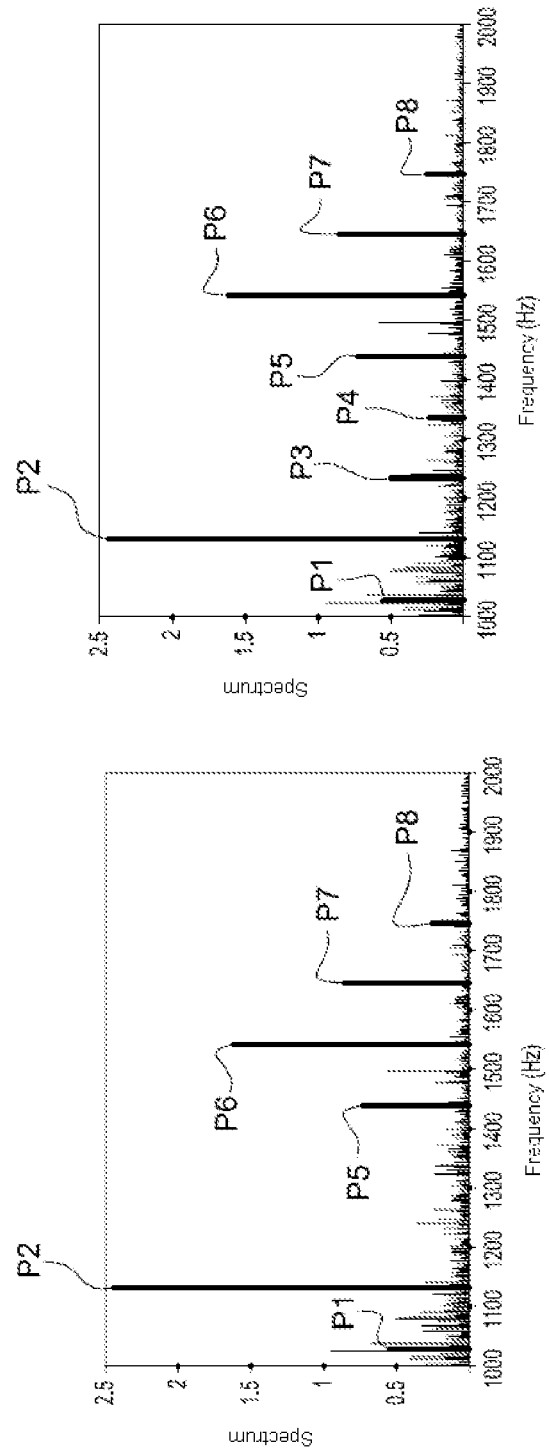

METHOD FOR DETECTING WEAR OF A TYRE CONTAINING A SONIC WEAR GAUGE

FIELD OF THE INVENTION

The present invention relates to a method for detecting the wear of a tyre. It applies especially, without being restricted thereto, to tyres for vehicles of any type, passenger vehicles or heavy goods vehicles.

BACKGROUND

A method for detecting the wear of a tyre by means of a processing device is known from FR 2 816 887.

When the tyre is worn beyond a predetermined radial wear threshold, sonic wear gauges emit a characteristic noise of characteristic frequency. This characteristic frequency is dependent especially on the speed of the vehicle, the geometry of installation of the sonic wear gauges and their number.

Knowing the characteristic frequency of the acoustic signal, the acoustic signal is then filtered in the vicinity of the characteristic frequency so as to extract therefrom a gauge signal. Next, a confidence index relating to the gauge signal is calculated. If the index is greater than a predetermined threshold, it is known that the predetermined radial wear threshold has been overstepped.

However, in order to implement this method, it is necessary to know and to store certain parameters of the tyre and of the sonic wear gauges, especially the speed of the vehicle, the geometry of installation of the sonic wear gauges and their number.

It is therefore necessary to have a memory unit into which these parameters are entered and in which they are stored.

In the case of the speed, it is necessary to have a unit for measuring the speed. This unit is linked to the processing device thereby giving rise to an additional cost during the fitting of the device.

Furthermore, when the tyre is changed, the parameters of the latter, especially the geometry of installation of the sonic wear gauges and their number, may change. This then entails modifying the parameters in the memory unit.

SUMMARY OF THE INVENTION

The aim of the invention is to provide a reliable method for detecting the wear of a tyre not necessarily requiring knowledge of the above parameters.

For this purpose, the subject of the invention is a method for detecting the wear of a tyre comprising a set of at least one sonic wear gauge emitting on the basis of a predetermined radial wear threshold an acoustic footprint noise comprising several acoustic footprint elementary frequency components, characterized in that:
  an acoustic signal liable to comprise the acoustic footprint noise is acquired, the acoustic signal comprising several elementary frequency components;
  several series of elementary frequency components are enumerated, each enumerated series being liable to form at least some part of the acoustic footprint elementary frequency components;
  a series, called the acoustic footprint series, is selected from among the enumerated series;
  a so-called local confidence index of the acoustic footprint series is determined;
  if a confidence index determined on the basis of the local confidence index is, in absolute value, greater or less than a predetermined threshold associated with this confidence index determined on the basis of the local confidence index, an alert of the wear of the tyre is emitted.

The method according to the invention makes it possible to alert a user of the tyre without necessarily knowing the parameters stated hereinabove. Indeed, the elementary frequency components of the acoustic footprint noise are characteristic of the noise emitted by the gauges. Thus, when the radial wear threshold of the tyre is exceeded, the acoustic footprint noise emitted by the gauges comprises several elementary frequency components distributed frequency-wise as a function of the parameters that one wishes not to have to enter into or modify in the processing device. This frequency distribution complies with a predetermined pattern. This pattern is defined by ratios of spacings between the elementary signals.

Thus, elementary frequency components of the acoustic signal acquired are identified. By enumerating several series composed of elementary frequency components and liable to form at least some part of the acoustic footprint elementary frequency components, that is to say in accordance with the predetermined pattern, series of elementary frequency components are enumerated, each liable to be characteristic of the noise emitted by the set of sonic wear gauges. As the acoustic footprint noise is unique and exhibits notable and distinctive characteristics by virtue of its predetermined pattern, the acoustic footprint series may be selected from among the enumerated series by means of predetermined criteria.

Once the acoustic footprint series has been selected, it is ensured that an alert will not be wrongly emitted by calculating a local confidence index. The index calculated on the basis of the local confidence index may be equal to the local confidence index itself.

Furthermore, by working with a signal in the frequency domain, a much greater signal-to-noise ratio than the signal-to-noise ratio of the corresponding amplitude signal is obtained. Selection of the acoustic footprint series is thus more reliable.

Advantageously, the sonic wear gauges are equi-distributed circumferentially in a tread of the tyre.

The circumferential equi-distribution of the gauges makes it possible to obtain a temporal equi-distribution of the noise emitted by each gauge when the tyre rolls at a constant speed. In the case where the tyre comprises only a single gauge, the latter also allows a temporal equi-distribution of the noise emitted when the tyre rolls at a constant speed.

Preferably, the pattern is a pattern in which the elementary frequency components are spaced apart pairwise by a substantially constant frequency interval. In this case, the spacing ratios are substantially all equal. As a variant, the spacing ratios are different.

Advantageously, the acoustic footprint series forms at least part of a Dirac comb.

In this case, each signal of the series forms a spike. Each spike represents a tooth of a comb, called a Dirac comb. In an analogous manner to a comb, each spike of the acoustic footprint series is substantially distant from at least one adjacent tooth, or indeed two, by a substantially constant frequency gap between each tooth.

An acoustic footprint series such as this exhibits a notable, unique and therefore easily detectable pattern of elementary frequency components.

According to an optional characteristic of the method, the set comprises from 1 to 32 and preferably from 1 to 12 gauges.

The more significant the number of wear gauges, the more significant the frequency gap between the elementary frequency components of the noise emitted by the gauges, the fewer elementary frequency components the sought-after acoustic footprint series comprises and therefore the more difficult it is to detect the acoustic footprint series. Indeed, the more elementary frequency components the acoustic footprint noise comprises, the more easily the acoustic footprint series can be identified from among the elementary frequency components of the acoustic signal acquired. Thus, the smaller the number of gauges, the easier the selection of the acoustic footprint series, the more reliable the detection of wear. Furthermore, for reasons related to the manufacture of the tyre and compatibility with the sculptures of the tread, it is advantageous to reduce the number of gauges as far as possible.

Optionally, each gauge comprises a sonic cavity devised so that, beyond a predetermined radial wear threshold, the cavity emerges radially to the exterior of the tyre and is devised so as to be closed by the ground in a substantially leaktight manner as it passes across the area of the contact of the tyre with the ground, the total volume of the cavity or cavities being greater than or equal to 2 cm3, preferably 5 cm3.

Below 2 cm3, the elementary frequency components of the acoustic footprint noise emitted by the gauges do not exhibit a spectral level, that is to say an intensity in frequency, that is sufficient to be distinguished in a reliable manner from the elementary frequency components corresponding to the noise of the engine and the noise of the associated drive train. Furthermore, this value is sufficiently low to allow cavities to be made in a conventional tyre without impairing its performance.

According to an optional characteristic of the method, the acoustic signal acquired is processed by implementing at least one of the following steps:

The frequency spectrum of the acoustic signal acquired is determined.

A frequency domain of the frequency spectrum of the acoustic signal acquired lying between 500 and 2500 Hz is isolated. The majority of the spectral energy of the noise measured in a vehicle is situated in an interval of frequencies below 150 Hz. These frequencies correspond to the noise of the engine and the noise of the associated drive train. The noise emitted by the gauges, especially in the case of cavities, is situated in a frequency interval lying between 500 and 2500 Hz. However, the latter exhibits a much lower raw spectral energy than the noise of the engine and of the drive train. Thus, by isolating the frequency domain in which only the noise emitted by the gauges is present, the accuracy of the detection method is improved and the amount of data to be manipulated is reduced. Furthermore, one benefits from a detectable signal without the latter being audible in the vicinity of the tyre.

Elementary frequency components of the frequency spectrum of the acoustic signal acquired exhibiting a spectral level greater than a predetermined threshold are isolated. Indeed, the elementary frequency components of the acoustic footprint noise emitted by the gauges exhibit, in terms of frequency, a much greater spectral level than the surrounding noise. Thus, elementary frequency components of low spectral level cannot form part of the elementary frequency components of the noise emitted by the gauges. It is therefore possible to retain only the elementary frequency components exhibiting a spectral level greater than the threshold without running the risk of deleting elementary frequency components useful to the detection of wear.

Preferably, at least one series of at least two elementary frequency components is selected, each elementary frequency component of the series being distant from at least one adjacent elementary frequency component of the series by a frequency gap lying in a predetermined reference frequency interval.

The frequency gap between the elementary frequency components of the acoustic footprint noise is characteristic of the noise emitted by the gauges. Thus, when the radial wear threshold of the tyre is exceeded, the acoustic footprint noise emitted by the gauges comprises several elementary frequency components distributed frequency-wise according to the predetermined pattern. The predetermined reference frequency interval corresponds to the set of the frequency gaps which may separate the elementary frequency components of the sought-after acoustic footprint series. Thus, this reference frequency interval covers all the frequency gaps that may separate two elementary frequency components of the sought-after acoustic footprint series.

The reference frequency interval is determined by taking account of the parameters that one wishes not to have to enter into or modify in the processing device. By taking extreme values of these parameters, bounds of the reference frequency interval are determined. These parameters comprise especially the speed of the vehicle on which the tyre is mounted, the number of gauges, the geometric characteristics of the gauges and the geometric characteristics of the tyre, especially its circumference when the radial wear threshold is exceeded.

In order to correctly select the acoustic footprint series, one determines whether the elementary frequency components of the acoustic footprint series do indeed correspond to elementary frequency components liable to constitute the elementary frequency components of the acoustic footprint noise emitted by the gauges. As these elementary frequency components are separated by one or more frequency gaps included in the reference frequency interval, it is possible to select the acoustic footprint series by comparing certain characteristics of the elementary frequency components of the acoustic signal with characteristics of one or more theoretical series or else by inter-comparing several series of elementary frequency components. This selection is especially done as a function of characteristics of the predetermined pattern comprising the spacing ratio for the elementary frequency components as well as spacing values for the elementary frequency components.

According to other optional characteristics of the method:

The predetermined reference frequency interval lies between 1 and 300 Hz. This frequency interval comprises the frequency gap liable to separate the elementary frequency components of the noise emitted by the gauges. Indeed, as specified hereinabove, the reference frequency interval is determined by taking account of the extreme values of the parameters that one wishes not to have to enter or modify. Thus, for a passenger vehicle, for a speed varying between 10 and 130 km/h, a number of gauges varying between 1 and 20 and a circumference varying between 1.30 m and 3.0 m, the frequency gap of the elementary frequency components of the noise emitted by the gauges belongs to the interval lying between 1 Hz and about 300 Hz. A similar range of frequencies is found for heavy goods vehicles travelling at speeds of less than 90 km/hour, equipped with tyres with 32 gauges maximum and with circumference varying between 2.1 and 3.7 m.

All the pairs of elementary frequency components of the acoustic signal acquired are enumerated and a frequency gap separating the elementary frequency components of each pair from one another is determined.

Each frequency gap of each pair of elementary frequency components is classed in a so-called frequency gap family defined by a family frequency gap interval. Preferably, the family frequency gap interval is equal to four times the frequency resolution of the spectrum. Furthermore, the greater the duration of acquisition, the better the signal-to-noise ratio in the frequency domain of the acoustic signal isolated. However, over this duration of acquisition, the speed must be substantially constant so that the frequency signal is faithful to the amplitude signal measured. A duration of acquisition of the order of 1 s and a frequency resolution of 1 Hz are satisfactory to ensure good detection. Thus, each family frequency gap interval lies substantially between 2 and 4 Hz.

Each family frequency gap interval is determined as a function of the predetermined reference frequency interval and of a frequency resolution of the frequency spectrum of the acoustic signal acquired.

In each family, all the series of elementary frequency components comprising at least two consecutive elementary frequency components separated by a so-called serial frequency gap, lying in the family frequency gap interval, are enumerated. This enumeration step makes it possible to ensure that the series of elementary frequency components corresponding to the noise emitted by the gauges will be detected from among all the enumerated series.

Advantageously, for each enumerated series of elementary frequency components:
  a search is conducted for at least one elementary frequency component that is distant from one of the elementary frequency components of the series by a frequency gap which is a multiple of the family frequency gap interval; and
  each enumerated series is supplemented with the elementary frequency component or components that are distant from one of the elementary frequency components of the series by a frequency gap which is a multiple of the family frequency gap interval.

This step makes it possible to reconstruct series that are altered by the acquisition and/or the isolation of the measured signals. Indeed, during the acquisition of the acoustic signal and/or the isolation steps, elementary frequency components might not be acquired or selected. Thus, for example, an enumerated series of elementary frequency components may comprise several elementary frequency components that are, pairwise, distant by a gap included in the family gap interval whereas another isolated elementary frequency component is distant from the last elementary frequency component of the enumerated series by a frequency gap substantially equal to twice the family gap interval of the enumerated series. It is probable that this isolated elementary frequency component also belongs to the series but that in the absence of an elementary frequency component inserted equidistantly between the last elementary frequency component of the enumerated series and this isolated elementary frequency component, the isolated elementary frequency component has not been integrated into the enumerated series.

In an optional manner, for each family:
  a serial index of each enumerated series is determined as a function of at least one first predetermined characteristic of the series.

In an embodiment of the method, for each family:
  a series is selected by comparing each serial index of the enumerated series;
  for each selected series, a family index of the series selected from each family is determined, as a function of at least one second predetermined characteristic of the selected series, and
  the acoustic footprint series is selected by comparing each family index of the selected series.

In this embodiment, the acoustic footprint series is selected in two successive steps. In a first step, an acoustic footprint series is selected in each family by virtue of the first predetermined characteristic or characteristics of each series. In a second step, the acoustic footprint series is selected from among all the series selected during the first step. This second selection is performed by virtue of the second predetermined characteristic or characteristics of each selected series.

The first and the second characteristics may be different so that the selection during the two steps is performed as a function of different criteria. Thus, for example, a series selected by virtue of the first characteristics might not exhibit the best serial index of all the series selected but exhibit the best family index of all the series selected, this making the acoustic footprint series thereof the most liable to constitute the series of elementary frequency components emitted by the gauges.

In another embodiment of the method, the acoustic footprint series is selected by comparing each serial index of each selected series of each family.

In this embodiment, the first and second characteristics are identical so that by comparing all the calculated serial indices, the acoustic footprint series is selected without needing to re-calculate another index for each selected series.

According to other optional characteristics of the method:
  A relevance index of each first and/or second characteristic is determined, each relevance index being defined by a variable function of sigmoid type of each first and/or second characteristic. The variable function of sigmoid type makes it possible to ascribe a very low confidence index for values of the first and/or second characteristics that it is desired to exclude independently of any other consideration about the series since they make it impossible for the acoustic footprint series to be the series of signals emitted by the gauges. Conversely, the variable function of sigmoid type makes it possible to ascribe a very high confidence index for values of the first and/or second characteristics that are considered to be typical of the series of signals emitted by the gauges.
  The local confidence index is determined on the basis of the relevance index or indices respectively of each first and/or second characteristic. The local confidence index may be calculated by forming the product of the relevance indices associated respectively with the first and with the second characteristics. As a variant, this may involve an arithmetic or weighted average. Thus, certain characteristics of the elementary frequency components may have greater significance than others.

Advantageously, the first and/or second predetermined characteristic or characteristics comprise a signal/noise ratio in the frequency domain and/or the number of elementary frequency components in the series and/or a dispersion of the frequency gap between the elementary frequency components of the series and/or the density of the elementary frequency components of the series.

In an embodiment of the method,
  several temporally successive acoustic signals liable to comprise the acoustic footprint noise are acquired, each acoustic signal comprising several elementary frequency components;

for each acoustic signal, an acoustic footprint series is selected and a local confidence index of the selected acoustic footprint series is determined;

a so-called global confidence index is determined on the basis of the local confidence indices of the acoustic footprint series;

if the global confidence index is, in absolute value, greater or less than a predetermined threshold associated with this global confidence index, an alert of the wear of the tyre is emitted.

The amplitude of the noise emitted by the gauges in the frequency domain depends especially on the road surface on which the tyre rolls. For example, relatively smooth ground is more favourable to the emission of the noise of the gauges than porous ground. However, detection remains possible in both cases. There therefore exist road surfaces that are favourable to detection and others that are less favourable, these two types of road surfaces possibly following one another randomly. Thus, a first local index may, for a first acoustic signal, be greater than the threshold associated with the local index, and then a second local index may, for a second acoustic signal, subsequent to the first, be less than the said threshold. In this case, it is not possible to say whether the radial wear threshold has actually been overstepped and whether the second index is less than the threshold because of a rather unfavourable road surface or whether the radial wear threshold has not been overstepped and whether the first index indicates this wrongly.

In order to reduce this risk of wrong alert and to render the detection method more reliable, several temporally successive acoustic signals are processed. If several acoustic footprint series of successive acoustic signals exhibit a local confidence index indicating an exceeding of the radial wear threshold, there is a high probability that the radial wear threshold has actually been overstepped, this being indicated by the global confidence index.

In another embodiment of the method:

several temporally successive acoustic signals liable to comprise the acoustic footprint noise are acquired, each acoustic signal comprising several elementary frequency components;

for each acoustic signal, an acoustic footprint series is selected;

a so-called global confidence index is determined on the basis of a temporal continuity between the elementary frequency components of each selected acoustic footprint series;

if the global confidence index is, in absolute value, greater or less than a predetermined threshold associated with this global confidence index, an alert of the wear of the tyre is emitted.

In this embodiment, the risk of wrong alert is also reduced. The global confidence index is determined on the basis of the graphical representation, independent of the local confidence indices, in contradistinction to the previous embodiment in which the global confidence index is dependent on the local confidence indices. Thus, the correct detection of the wear of the tyre is ensured by means of local and global confidence indices having no relation to one another thereby rendering the method more reliable.

The subject of the invention is also a computer program, characterized in that it comprises code instructions able to control the execution of the steps of the method such as is defined hereinabove when it is executed on a computer.

The invention also relates to a medium for recording data comprising, in recorded form, a program such as defined hereinabove.

Another subject of the invention is a making available of a program such as is defined hereinabove on a telecommunication network with a view to its downloading.

BRIEF DESCRIPTION OF THE DRAWINGS

The invention will be better understood on reading the description which follows, given solely by way of nonlimiting example and while referring to the drawings in which:

FIGS. 3A-3C illustrate theoretical signals in the time domain for modelling the noise emitted by sonic wear gauges for the tyre of FIGS. 1 and 2, FIGS. 4A-4C illustrate theoretic signals in the frequency domain obtained respectively from the signals in FIGS. 3A-3C, FIG. 3D shows a measured noise signal in the time domain, FIG. 4D shows a measured noise signal in the frequency domain obtained from the signal in FIG. 3D, FIG. 3E shows a signal in the time domain obtained by superposition of the signals in FIGS. 3C and 3D, and FIG. 4E shows a signal in the frequency domain obtained by superposition of the signals in FIGS. 4C and 4D;

FIGS. 6 to 10 illustrate acoustic signals of the noise inside a cabin of a vehicle fitted with tyres of FIGS. 1 and 2;

FIGS. 11 to 13 illustrate variations of relevance indices as a function of characteristics;

FIGS. 14 and 15 illustrate an additional step of a method according to a second embodiment of the method;

DETAIL DESCRIPTION OF EMBODIMENTS OF THE INVENTION

Figure 1:
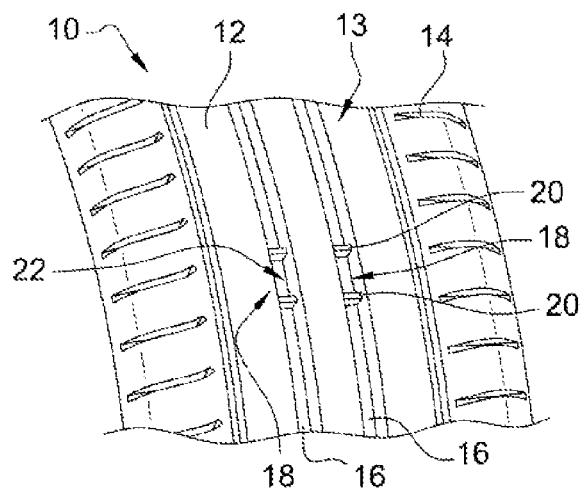
FIG. 1 illustrates a tread of a brand new tyre.
Figure 2:
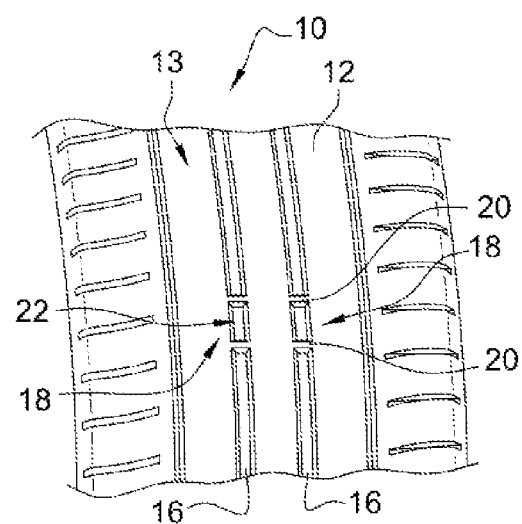
FIG. 2 illustrates a tread of the tyre of FIG. 1, in a worn state.
Figure 5:
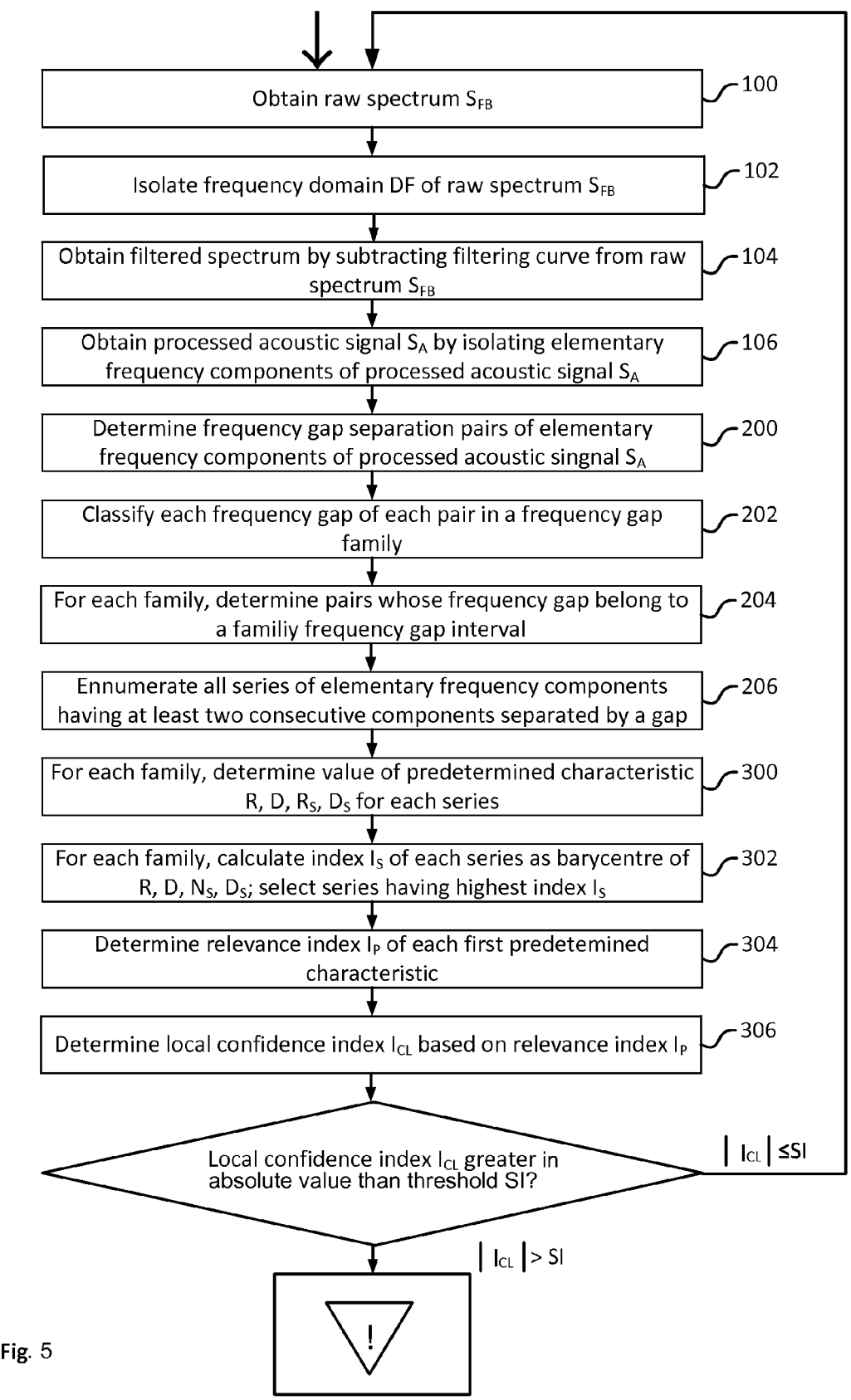
FIG. 5 is a diagram of the steps of the method according to a first embodiment of the invention.

A tyre designated by the general reference 10 has been represented in FIGS. 1 and 2. The tyre 10 comprises a tread 12 of substantially cylindrical shape, whose external surface 13 is furnished with sculptures 14. In particular, the tread 12 comprises two circumferential and parallel furrows 16, hollowed out in the surface of the tyre, of predetermined depth when the tyre 10 is brand new. For example, the depth of these furrows 16 is of the order of 8 mm for a passenger vehicle tyre and of 14 to 25 mm for a heavy goods vehicle tyre. The tyre 10 also comprises sonic wear gauges 18.

Each sonic wear gauge 18 comprises two ribs 20 made at the bottom of the furrows 16 and extending transversely to the furrows 16. The height of the ribs 20 is predetermined when the tyre is brand new. For example, the height of these ribs is substantially equal to 1.6 mm. Each furrow 16 comprises four gauges 18 equi-distributed circumferentially along each furrow 16, two gauges 18 of each furrow being substantially aligned axially. Thus, in total, the tread 12 comprises a set of eight sonic wear gauges 18. As a variant, the tyre can comprise from 1 to 32 gauges 18.

The volume defined by a furrow 16 and two neighbouring ribs 20 forms a cavity 22 emerging radially towards the exterior of the tyre 10.

When the tyre 10 is brand new, as is represented in FIG. 1, the height of the ribs 20 is smaller than the depth of the furrows 16 so that two neighbouring cavities 22 comprise a fluidic communication passage situated above the ribs 20.

Thus, even when the tread 12 is in contact with a ground, the ground does not completely close the cavities 22 since the top of the ribs 20 is not in contact with the ground. In this case, the neighbouring cavities 22 are in fluidic communication with one another via a constriction channel delimited by the top of the ribs and the ground covering the cavities 22.

The tyre 10 of FIG. 1 has been represented in FIG. 2 in a worn state in which the tread 12 has been progressively abraded, causing a loss of a few millimeters of radial thickness, of the order of 5 mm.

In this instance, the wear of the tread 12 of the tyre 10 as represented in FIG. 2 is of the order of 6 millimeters, that is to say greater than the distance separating, when the tyre is brand new, the top of the ribs 20 from the surface 13. Having regard to this pronounced wear, the top of the ribs 20 is at the same level as the surface 13. Thus, the mouth of each cavity 22 is defined by a substantially plane contour made on the tread 12 and the cavities 22 are distinct and separate from one another.

Each cavity 22 exhibits a length of the order of 10 to 50 millimeters corresponding to the circumferential gap between two adjacent ribs 20 and a depth of less than or equal to the initial height of the rib 18.

Thus, the total volume of the cavities 22 is greater than or equal to 2 cm3, preferably 5 cm3.

Because the mouth of each cavity 20 is defined by a substantially plane contour, it is able to be closed perfectly and hermetically by a smooth and plane ground while rolling. Stated otherwise, when the tyre 10 is worn, each cavity 22 is devised so as to be closed by the ground in a substantially leaktight manner as it passes across the contact area of the tyre 10 with the ground.

Such a cavity 20 formed on the surface of the tread 12 of a tyre which, on the one hand, emerges radially to the exterior of the tyre and, on the other hand, is devised to be closed hermetically as it passes across the contact area, is dubbed "sonic".

In a tyre according to the invention, sonic cavities such as these appear only when the tyre is worn beyond a predetermined radial wear threshold and are nonexistent below this threshold, in particular when the tyre is brand new.

In the course of the rolling of the tyre, a given sonic cavity 22 successively occupies an upstream position with respect to the area of contact of the tyre with the ground in which it is open, and then a position located in the contact area in which it is closed since it is covered by the ground, and then finally a downstream position with respect to the area of contact of the tyre with the ground in which it is open again and in which it is no longer covered by the ground.

Stated otherwise, the rotation of the tyre causes, for a given cavity, the intake of air into the cavity, the compression of the air contained in the cavity when the latter is closed by the ground in the contact area, and then the venting of the air contained in the cavity upon the opening of the latter by separation of the tread 12 from the ground.

This succession of intake/compression/venting steps gives rise to a characteristic noise, sometimes called hiss or pumping noise resulting from the venting of the compressed air contained in the cavity.

We shall now explain the principle of detecting the pumping noise emitted by the sonic wear gauges 18 with reference to FIGS. 3A-E and 4A-E. These figures illustrate the theoretical pumping noise of the worn passenger vehicle tyre of FIG. 2 rolling at a substantially constant speed of 90 km/h.

FIGS. 3A-3C illustrate theoretical signals in the time domain and FIGS. 4A-4C illustrate theoretical signals in the frequency domain obtained respectively from each signal 3A-3C by Fourier transform.

FIG. 3A illustrates a unit temporal signal $S_{T,U}$, called a pulse, of a gauge 18. This pulse represents the amplitude (in Pa) of the noise emitted by the gauge 18 and takes the form of a damped sinusoid exhibiting a natural frequency $f_0$, a maximum amplitude a0 and a characteristic damping duration $t_0$. In this instance, $f_0$=1200 Hz, $a_0$=0.044 Pa and $t_0$=0.001 s.

The unit frequency signal $S_u$ of FIG. 4A takes the form of a Gaussian centred on the natural frequency $f_0$. It will be noted that, the shorter the unit pulse, the less the sinusoid oscillates and the wider the frequency spectrum. Conversely, the longer the unit pulse, the more the sinusoid oscillates and the narrower the frequency spectrum. Thus, for an undamped perfect sinusoid, the Fourier transform of FIG. 4A would exhibit the shape of a Dirac spike of frequency $f_0$.

FIG. 3B illustrates a temporal signal $S_{T,D}$ of rolling of the gauges 18 of the tyre of FIG. 2. As the tyre comprises four pairs of gauges 18 distributed in the two furrows 16, the rolling temporal signal takes the form of a Dirac comb of period $T_{TUS}$=0.019 s and of amplitude 1 comprising several spikes corresponding to the passing of each gauge 18 across the contact area.

The rolling frequency signal $S_{F,D}$ also takes the form of a Dirac comb characterized by equi-distributed elementary frequency components, spaced apart by a pitch $F_{TUS}$=1/$T_{TUS}$ and of amplitude $F_{TUS}$=1/$T_{TUS}$=52.2. It is noted that the amplitude of the frequency signal $S_{F,D}$ is much greater than the amplitude of the temporal signal $S_{T,D}$.

FIG. 3C illustrates a total temporal signal $S_{T,T}$ of the gauges 18 corresponding to the convolution product of the unit temporal signal $S_{T,U}$ of FIG. 3A and of the rolling temporal signal $S_{T,D}$ of FIG. 3B. The total temporal signal $S_{T,T}$ therefore takes the form of a succession of damped sinusoids of maximum amplitude substantially equal to 0.044 Pa.

The total frequency signal $S_{F,T}$ corresponds to the product of the unit frequency signal $S_u$ of FIG. 4A and of the rolling frequency signal $S_{F,D}$ of FIG. 4B. The total frequency signal $S_{F,T}$ therefore takes the form of the unit frequency signal $S_u$ sampled at the frequency $F_{TUS}$ and amplified by a factor $F_{TUS}$ with respect to the temporal unit signal $S_{T,U}$. This amplification originates from the frequency conversion of the rolling temporal signal $S_{T,D}$ In this instance, the amplitude of the total frequency signal $S_{F,T}$ is substantially equal to 2.28 Pa.

In reality, the total signal $S_{T,T}$, $S_{F,T}$ of the gauges 18 is covered by a spurious signal B corresponding to the surrounding noise. The noise B has been recorded in the passenger compartment of a BMW 318d vehicle travelling at 90 km/h fitted with standard tyres.

FIG. 3D illustrates a temporal signal $B_T$ corresponding to the noise measured inside the cabin. The maximum amplitude of such noise $B_T$ is substantially equal to 0.034 Pa. The maximum amplitude of the corresponding frequency signal $B_F$ as represented in FIG. 4D is substantially equal to 0.348 Pa.

FIG. 3E illustrates a total temporal signal STT corresponding to the superposition of the total theoretical temporal signal $S_{T,T}$ of FIG. 3C and of the temporal signal corresponding to the noise $B_T$ of FIG. 3D. The signal-to-noise ratio in the time domain is substantially equal to 1.04. FIG. 4E illustrates a total frequency signal SFT corresponding to the superposition of the total theoretical frequency signal $S_{F,T}$ of FIG. 4C and of the frequency signal $B_F$ of FIG. 4D corresponding to the measured noise. The signal-to-noise ratio in the frequency domain is substantially equal to 13.4.

Analysis of these signals shows especially the benefit of working with signals in the frequency domain since they exhibit a greater signal-to-noise ratio than the signals in the time domain. The detection of wear and the reliability of this detection are thus greatly improved.

The total frequency signal SFT of FIG. 4E exhibits several characteristics comprising especially the predetermined distribution pattern, the pitch between each spike equal to $F_{TUS}$, the maximum amplitude A of the signal and the number of elementary frequency components N of the signal.

$F_{TUS}$ is dependent on the speed V of the tyre 10, the number $N_{TUS}$ of equi-distributed gauges 18 and the circumference C of the tyre 10.

The maximum amplitude A is dependent on the characteristic damping duration $t_0$, the total volume $V_{TUS}$ of the cavities 22 and the speed V of the tyre 10. The maximum amplitude A is also dependent on temporal signal acquisition parameters comprising a sampling frequency Fe and a duration of acquisition T of the temporal signal.

The number of elementary frequency components N is dependent on the bandwidth of the elementary pulse of each gauge 18 which itself depends on the characteristic damping duration $t_0$. N also depends on the frequency $F_{TUS}$, the interaction of the total signal of the gauges 18 and the signal corresponding to the noise and the frequency resolution $\Delta f$ defined as the ratio of the sampling frequency Fe to the duration of acquisition T.

We shall now describe the detection method according to the invention with reference to FIGS. 5 to 11.

Represented in FIG. 6 is a raw total temporal signal $S_{T,B}$ of an acoustic noise measured in the passenger compartment of a BMW 318d vehicle fitted with a worn front right tyre according to FIG. 2. The acquisition parameters are T=1 s, Fe=8000 Hz. However, the characteristics of the tyre 10, such as the number $N_{TUS}$ of gauges 18, the circumference C of the tyre 10, the total volume $V_{TUS}$ of the cavities 22 and the speed V of the vehicle, are not known.

A raw temporal acoustic signal $S_{T,B}$ liable to comprise the acoustic footprint noise $S_{F,T}$ is acquired during a step 100. A Fourier transform is applied to the raw total temporal signal $S_{T,B}$ so as to obtain a raw total frequency spectrum $S_{F,B}$ represented with a logarithmic frequency scale in FIG. 7.

In the optional steps 102 to 106 hereinafter, elementary frequency components of the acoustic signal acquired are identified.

During a step 102, a frequency domain Df of the raw spectrum $S_{F,B}$ lying between 500 and 2500 Hz is then isolated, here between 1000 and 2000 Hz represented with a linear frequency scale in FIG. 8.

Next, in a step 104, the noise is eliminated and the raw spectrum $S_{F,B}$ is optionally normalized in the frequency domain Df. In this instance, a filtering curve passing through the minima of the raw spectrum $S_{F,B}$ is defined, and then the filtering curve is subtracted from the raw spectrum $S_{F,B}$. The filtered spectrum represented in FIG. 9 is then obtained. A normalization can optionally be performed on this filtered spectrum.

Finally, in a step 106, the elementary frequency components of the filtered spectrum of FIG. 9 exhibiting an intensity greater than a predetermined intensity threshold are isolated. As represented in FIG. 10, a sharp spectrum $S_A$ comprising several elementary frequency components is thus obtained. The sharp spectrum or processed acoustic signal $S_A$ is therefore obtained on the basis of the raw total temporal signal $S_{T,B}$ which has been processed. As a variant, the processing steps might not take place or else other additional filtering steps are implemented.

Steps 100 to 106 are also steps of processing the signal $S_{T,B}$.

In this instance, the processed acoustic signal $S_A$ comprises 30 elementary frequency components, numbered from 1 to 30 in FIG. 10. If the tyre is worn, the sonic cavities emit a signal analogous to the theoretical signal illustrated in FIG. 4C. In order to determine whether the tyre is worn, that is to say whether the sonic cavities 22 are emitting the pumping noise, it is therefore appropriate to determine whether the signal $S_A$ comprises a signal analogous to the theoretical signal $S_{F,T}$ emitted by the gauges 18 in the absence of knowledge of the characteristics of the tyre 10, such as the number $N_{TUS}$ of gauges 18, the circumference C of the tyre 10, the total volume $V_{TUS}$ of the cavities 22, and the speed V of the vehicle.

It was seen that the unavailable characteristics define a reference frequency interval I to which the frequency $F_{TUS}$ is liable to belong. For a range of passenger car tyres, the circumference of which may vary between 1.3 m and 3 m, the number of gauges of which may vary between 1 and 10 and for which the speed of the vehicle may vary between 10 km/h and 130 km/h, the frequency $F_{TUS}$ may vary in the interval I lying between 1 and 278 Hz. For tyres of heavy goods vehicle type, the interval I is similar.

With reference to FIG. 10, during a step 200, all the pairs of elementary frequency components of the processed acoustic signal $S_A$ are enumerated and a frequency gap separating the signals of each pair from one another is determined.

For 30 elementary frequency components, 435 possible pairs are then obtained. Only the pairs for which the frequency gap separating them belongs to the interval I are retained. Thus, only 317 pairs exhibit a frequency gap lying in the interval 1-278 Hz. By way of example, 40 pairs of elementary frequency components out of the 317 together with the corresponding frequency gaps have been represented in table 1 hereinbelow.

TABLE 1

Example of pairs of elementary frequency components and corresponding frequency gaps

| Frequency component no. beginning | Frequency component no. end | Frequency gap (Hz) |
| --- | --- | --- |
| 4 | 5 | 4 |
| 4 | 6 | 6 |
| 4 | 7 | 12 |
| 4 | 8 | 28 |
| 4 | 9 | 38 |
| 4 | 10 | 41 |
| 4 | 11 | 52 |
| 4 | 12 | 54 |
| 4 | 13 | 70 |
| 4 | 14 | 73 |
| 4 | 15 | 78 |
| 4 | 16 | 106 |
| 4 | 17 | 131 |
| 4 | 18 | 139 |
| 4 | 19 | 209 |
| 4 | 20 | 215 |
| 4 | 21 | 238 |
| 4 | 22 | 246 |
| 4 | 23 | 248 |
| 5 | 6 | 2 |
| 22 | 28 | 271 |
| 23 | 24 | 47 |
| 23 | 25 | 64 |
| 23 | 26 | 85 |
| 23 | 27 | 166 |
| 23 | 28 | 269 |
| 24 | 25 | 17 |

TABLE 1-continued

Example of pairs of elementary frequency components and corresponding frequency gaps

| Frequency component no. beginning | Frequency component no. end | Frequency gap (Hz) |
|---|---|---|
| 24 | 26 | 38 |
| 24 | 27 | 119 |
| 24 | 28 | 222 |
| 25 | 26 | 21 |
| 25 | 27 | 102 |
| 25 | 28 | 205 |
| 26 | 27 | 81 |
| 26 | 28 | 184 |
| 27 | 28 | 103 |
| 27 | 29 | 205 |
| 28 | 29 | 102 |
| 28 | 30 | 205 |
| 29 | 30 | 103 |

Next, in a step 202, each frequency gap of each pair of elementary frequency components is classed in a so-called frequency gap family, defined by a family frequency gap interval $\sigma_F$. Each family frequency gap interval lies in the interval I and is determined as a function of the interval I and of a frequency resolution $\Delta f$ of the acoustic signal $S_A$. In this instance, frequency-gap families are defined 26, whose frequency gap intervals are given in table 2 hereinbelow and are all less than or equal to 4 Hz. As a variant all the intervals $\sigma_F$ are less than or equal to 2 Hz.

TABLE 2

Families of frequency gaps

| Family no. | Lower bound of each family frequency gap interval s F (Hz) | Upper bound of each frequency gap interval s F (Hz) |
|---|---|---|
| 1 | 2 | 6 |
| 2 | 8 | 12 |
| 3 | 13 | 17 |
| 4 | 18 | 22 |
| 5 | 23 | 26 |
| 6 | 28 | 32 |
| 7 | 33 | 37 |
| 8 | 38 | 42 |
| 9 | 45 | 49 |
| 10 | 50 | 54 |
| 11 | 55 | 58 |
| 12 | 61 | 65 |
| 13 | 66 | 70 |
| 14 | 76 | 80 |
| 15 | 81 | 85 |
| 16 | 86 | 90 |
| 17 | 102 | 106 |
| 18 | 115 | 119 |
| 19 | 165 | 168 |
| 20 | 202 | 206 |
| 21 | 207 | 211 |
| 22 | 225 | 229 |
| 23 | 232 | 236 |
| 24 | 238 | 242 |
| 25 | 254 | 258 |
| 26 | 260 | 263 |

In what follows, we shall only describe the processing of family no. 17 during a step 204, the processing of the other families being deduced therefrom mutatis mutandis. Among the 317 pairs, the pairs whose frequency gap separating them belongs to family frequency gap interval no. 17, here to the interval 102-106 Hz, are determined, as is illustrated in table 3.

TABLE 3

Pairs of elementary frequency components of family no. 17

| Family component no. begining | Frequency component no. end | Serial frequency gap Es (Hz) | Family no. |
|---|---|---|---|
| 4 | 16 | 106 | 17 |
| 5 | 16 | 102 | 17 |
| 8 | 17 | 103 | 17 |
| 16 | 19 | 103 | 17 |
| 19 | 25 | 103 | 17 |
| 25 | 27 | 102 | 17 |
| 27 | 28 | 103 | 17 |
| 28 | 29 | 102 | 17 |
| 29 | 30 | 103 | 17 |

Next, in a step 206, all the series of elementary frequency components comprising at least two consecutive elementary frequency components separated by a so-called serial frequency gap Es lying in the family frequency gap interval $\sigma_F$ are enumerated. Each enumerated series is liable to form at least some part of the acoustic footprint elementary frequency components. This in fact entails reconstructing the characteristic Dirac comb of the total signal of the gauges 18. For family No. 17, 3 series are therefore enumerated, grouped together in table 4 hereinbelow. Each enumerated series comprises at least two elementary frequency components spaced apart pairwise by a frequency gap lying in the reference frequency interval I and more precisely in the family frequency gap interval $\sigma_F$. Thus, each acoustic footprint series is liable to represent a theoretical signal engendered by the gauges 18 with values of the unknown characteristics, namely the number $N_{TUS}$ of gauges 18, the circumference C of the tyre 10, the total volume $V_{TUS}$ of the cavities 22, and the speed V of the vehicle.

TABLE 4

Series enumerated in family 1

| Series number | Elementary frequency components of the series |
|---|---|
| 1 | 4-16-19-25-27-28-29-30 |
| 2 | 5-16-19-25-27-28-29-30 |
| 3 | 8-17 |

Steps 200 to 206 are steps allowing the enumeration of the series of elementary frequency components.

Thereafter, in a step 300, for each family, a serial index Is of confidence of each enumerated series is determined as a function of first predetermined characteristics. These first predetermined characteristics comprise a dispersion $D_E$ of the frequency gap between the elementary frequency components of the series, a ratio R between the acoustic signal and the noise, the number Ns of elementary frequency components in the series and the density D of the series, that is to say the ratio of the total number of elementary frequency components to the maximum number of possible elementary frequency components. In this instance, for series No. 2, $D_E$=0.5, R=13.4, Ns=8, D=100%.

Next, in a step 302, the index Is is calculated as a barycentre of R, D, Ns and $D_E$. The index Is of each series of each family is calculated. Next, the indices Is of each enumerated series of each family are compared. Here, the higher the index Is, the more liable the corresponding series is to represent the sought-after theoretical signal. The acoustic footprint series having the highest index Is is then selected. In this instance, series No. 2 of family No. 17 possesses the highest index Is=0.994 of the three series identified.

As a variant, after the calculation of the index Is of each enumerated series of each family, one series is selected from each of the 26 families as a function of the first predetermined characteristics. Therefore 26 selected series are obtained. Next, for each series selected from each family, a family index If is determined as a function of second predetermined characteristics of each selected series. The first and the second characteristics can be identical or different. Finally, the acoustic footprint series is selected by comparing each family index If of the 26 selected series.

Although acoustic footprint series No. 2 of family No. 17 is the one most liable to constitute the one corresponding to the noise emitted by the gauges out of all the enumerated series, it is not excluded that the first characteristics of this series remain insufficient to emit an alert of the wear of the tyre.

Thus, in a step 304, a relevance index Ip of each first characteristic is determined, in this instance of the ratio R (FIG. 11), of the dispersion $D_E$ of the frequency gap (FIG. 12) of the number $N_s$ of elementary frequency components in the series (FIG. 13) and of the density D of the series. In these figures, each relevance index is defined by a variable function of sigmoid type of each first characteristic. For example, for an acoustic footprint series exhibiting a ratio R=7, the relevance index Ip associated with N is equal to 0.98. For an acoustic footprint series exhibiting a dispersion $D_E$=1.5, the relevance index Ip associated with $D_E$ is equal to 0.9. For an acoustic footprint series comprising $N_s$=4 elementary frequency components, the relevance index Ip associated with $N_s$ is equal to 0.5.

Thereafter, during a step 306, a local confidence index lcI is calculated on the basis of the indices Ip. The index Ic is equal to the product of the indices Ip. As a variant, lcI is equal to an arithmetic or weighted average of the indices Ip.

Steps 300 to 302 are steps of selecting the acoustic footprint series.

Steps 304 to 306 are steps of calculating indices making it possible not to emit an alert wrongly.

If the confidence index lcI is greater, in absolute value, than a predetermined local threshold SI associated with the index Id, in this instance 0.99, an alert of the wear of the tyre 10 is emitted.

A method according to a second embodiment will now be described with reference to FIGS. 14 and 15.

In this embodiment, a step of reconstructing the series is performed before the step of determining the index Is and after the step of enumerating the series in each family. Indeed, it may happen that signals of an unenumerated series have been impaired, for example because of abnormal measurement conditions. Thus, a series, which would, under normal measurement conditions, have been enumerated and comprised eight elementary frequency components P1-P8 as represented in FIG. 15 has been split into two series comprising respectively the elementary frequency components P1-P2 and the elementary frequency components P5-P8 as represented in FIG. 14. The elementary frequency components P3 and P4 have not been detected. In order to reconstruct the whole series, after the step of enumerating the series in each family, a search is conducted for at least one signal that is distant from one of the signals of the series by a frequency gap which is a multiple of the family frequency gap interval $\sigma_F$. It is found that the spike P5 is distant from P1 and P2 by a gap substantially equal to respectively four and three times the family frequency gap interval sF. Thus, the enumerated series consisting of the elementary frequency components P1-P2 is supplemented with the signals of the series consisting of the elementary frequency components P5-P8 which are distant from one of the signals P1-P2 by a frequency gap which is a multiple of the family frequency gap sF.

Figure 16:
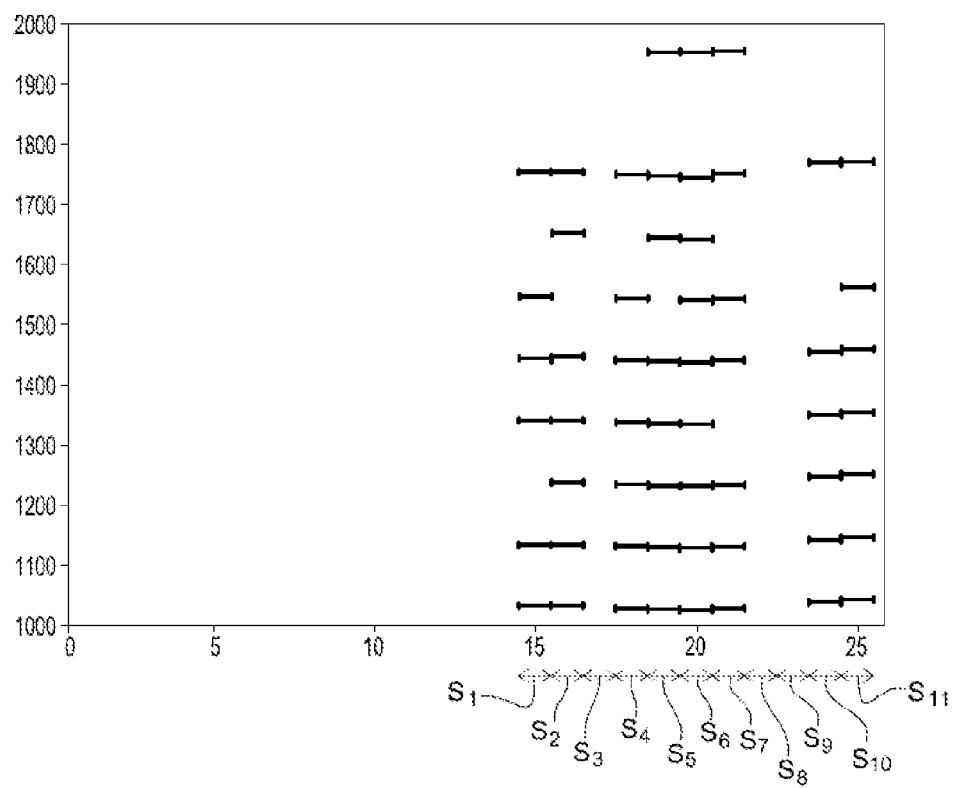
FIG. 16 illustrates several frames of acoustic signals measured successively in accordance with third and fourth embodiments of the method.

A method according to a third embodiment will now be described with reference to FIG. 16.

In contradistinction to the first embodiment, no alert is emitted when the local confidence index lcI is greater than the local threshold SI. Indeed, several successive acoustic signals are isolated in the frequency domain. For each acoustic signal, an acoustic footprint series is selected. The signals of the acoustic footprint series S1-S11 selected on the basis of the successive acoustic signals are represented graphically, as in FIG. 16, as a function of time. It will be noted that the series S3, S8 and S9 do not appear. This may be due to the spurious noise for example. The small shifts in frequency from one series to the other are due to the weak variations in the speed which changes the frequency $F_{TUS}$ separating two adjacent elementary frequency components of each acoustic footprint series.

A global confidence index Icg is determined on the basis of a continuity over time of the signals of the acoustic footprint series. Here, the position of the signals of a series is compared with the signals of the next series. As a variant, the graphical representation of the signals is used, for example by means of image recognition algorithms. If the index Icg is greater, in absolute value, than a predetermined global threshold Sg associated with this global index Icg, an alert of the wear of the tyre is emitted.

A method according to a fourth embodiment will now be described.

As in the third embodiment, no alert is emitted when the local confidence index lcI is greater than the local threshold SI. Indeed, several successive acoustic signals are isolated in the frequency domain. For each acoustic signal, an acoustic footprint series is selected. Next, the local confidence index lcI corresponding to each acoustic signal is determined. A global confidence index Icg is determined on the basis of these local indices Id, for example by a sliding average of the last 5 local indices. If the index Icg is greater, in absolute value, than a predetermined global threshold Sg associated with this global index Icg, an alert of the wear of the tyre is emitted.

The invention is not limited to the embodiments described hereinabove.

Indeed, the method according to the invention may also be implemented by knowing all or some of the parameters of the tyre determining the frequency $F_{TUS}$. Thus, by knowing the number $N_{TUS}$ of gauges 18, especially because all the tyres comprising gauges of this type 18 comprise an identical number thereof, the circumference C of the tyre 10 and the speed V of the tyre 10, for example on the basis of a GPS (Global Positioning System), the reference frequency interval is reduced and the reliability of the detection is improved. For example, by knowing the speed V=90 km/h with an accuracy of ±5 km/h of a tyre of circumference C=1.927 m comprising $N_{TUS}$=4, the reference frequency interval lies between 49 Hz and 55 Hz. Therefore, the more accurately the parameters of the tyre are known, the more unique and easy it is to detect the comb.

All or part of the method according to the invention may be implemented by way of code instructions able to control the execution of the steps of the method when it is executed on a computer. The instructions may be issued by computer programs recorded on a data recording medium for example of the hard disc or flash memory, CD or DVD type. Provision may be made to make such a program available with a view to its downloading on a telecommunication network such as the Internet network or a wireless network. Updates of the program will thus be able to be dispatched by this network to the computers connected to the network.

The invention claimed is:

1. A method for detecting wear of a tyre, wherein the tyre includes at least one sonic wear gauge emitting, based on a predetermined radial wear threshold, an acoustic footprint noise that includes a plurality of acoustic footprint elementary frequency components, the method comprising steps of:
   acquiring an acoustic signal that includes the acoustic footprint noise;
   enumerating a plurality of series of elementary frequency components, each enumerated series of the enumerated plurality of series forming at least a part of the elementary frequency components of the acoustic signal;
   selecting an acoustic footprint series from among the enumerated plurality of series, wherein the acoustic footprint series forms at least part of a Dirac comb;
   determining a local confidence index of the acoustic footprint series; and
   emitting a tyre wear alert, when a confidence index, which is determined based the local confidence index, is in absolute value at least one of greater than, less than, and equal to a predetermined threshold associated with the confidence index.

2. A method according to claim 1, wherein a plurality of sonic wear gauges are equi-distributed circumferentially in a tread of the tyre.

3. A method according to claim 1, wherein the tyre includes from 1 to 32 sonic wear gauges.

4. A method according to claim 1, wherein each of the at least one sonic wear gauge includes a sonic cavity structured so that:
   beyond a predetermined radial wear threshold, the sonic cavity emerges radially to an exterior of the tyre,
   the sonic cavity is closed by a ground in a substantially leak-tight manner as the sonic cavity passes across an area of contact of the tyre with the ground, and
   a total volume of the sonic cavity or cavities is greater than or equal to 2 cm$^3$.

5. A method according to claim 1, wherein the acquired acoustic signal is processed by implementing at least one of:
   determining a frequency spectrum of the acquired acoustic signal;
   isolating a frequency domain of the frequency spectrum of the acquired acoustic signal lying between 500 and 2500 Hz; and
   isolating elementary frequency components of the frequency spectrum of the acquired acoustic signal exhibiting a level greater than a predetermined threshold.

6. A method according to claim 1, wherein a series of at least two elementary frequency components is selected, each elementary frequency component of the series being distant from at least one adjacent elementary frequency component of the series by a frequency gap lying in a predetermined reference frequency interval.

7. A method according to claim 6, wherein the predetermined reference frequency interval lies between 1 and 300 Hz.

8. A method according to claim 1, wherein, in the enumerating step,
   pairs of elementary frequency components are enumerated, and,
   for each pair of elementary frequency components, a frequency gap separating the elementary frequency components from one another is determined.

9. A method according to claim 8, wherein each frequency gap of each pair of elementary frequency components is classed in a frequency gap family defined by a family frequency gap interval.

10. A method according to claim 9, wherein, for each frequency gap family, all series of elementary frequency components that include at least two consecutive elementary frequency components separated by a serial frequency gap, lying in a corresponding family frequency gap interval, are enumerated.

11. A method according to claim 10, wherein, for each enumerated series of elementary frequency components:
   a search is conducted for at least one elementary frequency component that is distant from one of the elementary frequency components of the enumerated series by a frequency gap that is a multiple of the corresponding family frequency gap interval, and
   the enumerated series is supplemented with the elementary frequency component or components that are found in the search.

12. A method according to claim 10, wherein, for each frequency gap family, a serial index of each enumerated series is determined as a function of at least one first predetermined characteristic of the enumerated series.

13. A method according to claim 12, further comprising steps of:
   for each frequency gap family, selecting a series by comparing each serial index of the enumerated series;
   for each selected series, determining a family index of the selected series as a function of at least one second predetermined characteristic of the selected series; and
   selecting the acoustic footprint series by comparing each family index of the selected series.

14. A method according to claim 13, wherein a relevance index of each second predetermined characteristic is determined, with each relevance index being defined by a variable function of sigmoid type of each second predetermined characteristic.

15. A method according to claim 14, wherein the local confidence index is determined based on the relevance index of each second predetermined characteristic.

16. A method according to claim 13, wherein each second predetermined characteristic includes at least one of:
   a signal/noise frequency ratio,
   a number of elementary frequency components in the selected series,
   a dispersion of the frequency gap between the elementary frquency components of the selected series, and
   a density of the elementary frequency components of the selected series.

17. A method according to claim 12, wherein the acoustic footprint series is selected by comparing each serial index of each selected series of each frequency gap family.

18. A method according to claim 12, wherein a relevance index of each first predetermined characteristic is determined, with each relevance index being defined by a variable function of sigmoid type of each first predetermined characteristic.

19. A method according to claim 18, wherein the local confidence index is determined based on the relevance index of each first predetermined characteristic.

20. A method according to Claim 12, wherein each first predetermined characteristic includes at least one of:
   a signal/noise frequency ratio,
   a number of elementary frequency components in the selected series, a dispersion of the frequency gap between the elementary frequency components of the selected series, and a density of the elementary frequency components of the selected series.

21. A method according to claim 8, wherein each frequency gap of each pair of elementary frequency components is classed in a frequency gap family defined by a family frequency gap interval, and each family frequency gap interval is determined as a function of a predetermined reference frequency interval and of a frequency resolution of a frequency spectrum of the acquired acoustic signal.

22. A method according to claim 1, further comprising steps of:

acquiring a plurality of temporally successive acoustic signals of the acoustic footprint noise, each of the acoustic signals including a plurality of elementary frequency components;

for each of the acoustic signals, selecting an acoustic footprint series, and determining a local confidence index of the selected acoustic footprint series; and determining a global confidence index based on the local confidence indices of the selected acoustic footprint series, wherein the emitting of the tyre wear alert occurs when the global confidence index is, in absolute value, at least one of greater than, less than, and equal to a predetermined threshold associated with the global confidence index.

23. A method according to claim 1, further comprising steps of:

acquiring a plurality of temporally successive acoustic signals of the acoustic footprint noise, each of the acoustic signals including a plurality of elementary frequency components;

for each of the acoustic signals, selecting an acoustic footprint series; and for each selected acoustic footprint series, determining a global confidence index based on a temporal continuity between the elementary frequency components of the selected acoustic footprint series, wherein the emitting of the tyre wear alert occurs when the global confidence index is, in absolute value, at least one of greater than, less than, and equal to a predetermined threshold associated with the global confidence index.

24. A method according to claim 1, wherein the method is performed by a computer executing a computer program that includes code instructions for implementing the steps of the method.

25. A non-transient computer-readable storage medium storing code instructions that, when executed by a computer, causes the computer to implement a method for detecting wear of a tyre, wherein the tyre includes at least one sonic wear gauge emitting, based on a predetermined radial wear threshold, an acoustic footprint noise that includes a plurality of acoustic footprint elementary frequency components, the method including steps of:

acquiring an acoustic signal that includes the acoustic footprint noise;

enumerating a plurality of series of elementary frequency components, each enumerated series of the enumerated plurality of series forming at least a part of the elementary frequency components of the acoustic signal;

selecting an acoustic footprint series from among the enumerated plurality of series, wherein the acoustic footprint series forms at least part of a Dirac comb;

determining a local confidence index of the acoustic footprint series; and emitting a tyre wear alert, when a confidence index, which is determined based the local confidence index, is in absolute value at last one of greater than, less than, and equal to a predetermined threshold associated with the confidence index.

26. A method for providing tyre wear detection, the method comprising steps of:

storing code instructions on a non-transient computer-readable storage medium, wherein the code instructions, when executed by a computer, causes the computer to implement a wear-detection method for detecting wear of a tyre, wherein the tyre includes at least one sonic wear gauge emitting, based on a predetermined radial wear threshold, an acoustic footprint noise that includes a plurality of acoustic footprint elementary frequency components, the wear-detection method including steps of:

acquiring an acoustic signal that includes the acoustic footprint noise, enumerating a plurality of series of elementary frequency components, each enumerated series of the enumerated plurality of series forming at least a part of the elementary frequency components of the acoustic signal, selecting an acoustic footprint series from among the enumerated plurality of series, wherein the acoustic footprint series forms at least part of a Dirac comb, determining a local confidence index of the acoustic footprint series, and emitting a tyre wear alert, when a confidence index, which is determined based the local confidence index, is in absolute value at least one of greater than, less than, and equal to a predetermined threshold associated with the confidence index; and enabling the code instructions to be accessed via a telecommunication network.

* * * * *

UNITED STATES PATENT AND TRADEMARK OFFICE
CERTIFICATE OF CORRECTION

| | | |
|---|---|---|
| PATENT NO. | : 8,881,573 B2 | |
| APPLICATION NO. | : 13/513005 | |
| DATED | : November 11, 2014 | |
| INVENTOR(S) | : Antoine Paturle | |

It is certified that error appears in the above-identified patent and that said Letters Patent is hereby corrected as shown below:

On The Title Page

ITEM [57] ABSTRACT

Line 10, "An" should read --A local confidence index of the--.

In The Drawings

SHEET 3

Figure 3, box 206, "Ennumerate" should read --Enumerate--.

In The Specification

COLUMN 2

Line 1, Close up left margin.
Line 2, Close up left margin.

COLUMN 3

Line 19, "2cm3, preferably 5cm3." should read --$2cm^3$, preferably $5cm^3$.--.
Line 20, "2cm3," should read --$2cm^3$,--.

COLUMN 8

Line 38, "DETAIL" should read --DETAILED--.

Signed and Sealed this
Thirteenth Day of October, 2015

Michelle K. Lee
*Director of the United States Patent and Trademark Office*

CERTIFICATE OF CORRECTION (continued)
U.S. Pat. No. 8,881,573 B2

COLUMN 9

Line 26, "2cm3, preferabley 5cm3." should read --$2cm^3$, preferably $5cm^3$.--.

COLUMN 10

Line 9, "a0" should read --$a_0$--.
Line 11, "signal $S_u$" should read --signal $S_{F,u}$--.
Line 40, "signal $S_u$" should read --signal $S_{F,u}$--.
Line 42, "signal $S_u$" should read --signal $S_{F,u}$--.

COLUMN 15

Line 31, "index 1cI" should read --index IcI--.
Line 33, "1cI" should read --IcI--.

COLUMN 16

Line 6, "index 1cI" should read --index IcI--.
Line 31, "index 1cI" should read --index IcI--.
Line 35, "1cI" should read --IcI--.
Line 37, "indices Id," should read --indices IcI,--.

In The Claims

COLUMN 20

Line 17, "at last one" should read --at least one--.
Line 24, "causes the computer" should read --cause the computer--.